US007681241B2

(12) United States Patent
Cox

(10) Patent No.: US 7,681,241 B2
(45) Date of Patent: Mar. 16, 2010

(54) APPARATUS AND METHOD FOR MANAGING DIGITAL RIGHTS WITH ARBITRATION

(75) Inventor: Alan Cox, Swansea (GB)

(73) Assignee: Red Hat, Inc., Raleigh, NC (US)

(*) Notice: Subject to any disclaimer, the term of this patent is extended or adjusted under 35 U.S.C. 154(b) by 1430 days.

(21) Appl. No.: 10/870,547

(22) Filed: Jun. 18, 2004

(65) Prior Publication Data

US 2006/0005256 A1    Jan. 5, 2006

(51) Int. Cl.
    *G06F 21/00* (2006.01)
(52) U.S. Cl. ......................................................... 726/27
(58) Field of Classification Search .................. 726/27, 726/26
    See application file for complete search history.

(56) References Cited

U.S. PATENT DOCUMENTS

| | | | |
|---|---|---|---|
| 5,553,239 | A | 9/1996 | Heath et al. |
| 5,828,876 | A | 10/1998 | Fish et al. |
| 5,864,620 | A | 1/1999 | Pettitt |
| 6,438,690 | B1 | 8/2002 | Patel et al. |
| 6,442,688 | B1 | 8/2002 | Moses et al. |
| 2002/0138724 | A1 | 9/2002 | Aull |
| 2002/0161718 | A1* | 10/2002 | Coley et al. ................... 705/59 |
| 2002/0161997 | A1* | 10/2002 | Yamasaki et al. ........... 713/150 |
| 2002/0186299 | A1* | 12/2002 | Cofer ........................... 348/152 |
| 2005/0138406 | A1* | 6/2005 | Cox ............................. 713/200 |

OTHER PUBLICATIONS

PCT International Search Report from International Application No. PCT/US2005/021917 dated Dec. 22, 2005.
PCT Written Opinion of the International Searching Authority from International Application No. PCT/US2005/021917 dated Dec. 22, 2005.
Adams, Steve. Oct. 1999. *Oracle8i Internal Services: for Waits, Latches, Locks, and Memory.* O'Reilly & Associates, Inc. Sebastopool, California.
Shah, Jay. 1991. "VAXclusters and Other High-Availability Systems." *VAXclusters: Architecture, Programming and Management.* McGraw-Hill, Inc. p. 57-99.
Kenah, Lawrence J. et al. 1984. "VAX/VMS Lock Manager." *VAX/VMS Internals and Data Structures.* Digital Press. p. 244-263.

* cited by examiner

*Primary Examiner*—Gilberto Barron, Jr.
*Assistant Examiner*—Samson B Lemma
(74) *Attorney, Agent, or Firm*—Wilmer Cutler Pickering Hale and Dorr LLP

(57) ABSTRACT

A method is disclosed for controlling access to a digital content. The method allows receipt of a notice regarding suspension of a sender's rights to use the content. A trusted third party arbiter transmits a key to restore the sender's access to the content. Information regarding at least the sender and the key is then documented. The sender can also be required to supply proof of ownership or authority to access the content. This can be in the form of original licensing information supplied by the content provider. The key can also be generated such that it expires after a predetermined length of time.

54 Claims, 4 Drawing Sheets

APPARATUS AND METHOD FOR MANAGING DIGITAL RIGHTS WITH ARBITRATION

BACKGROUND OF THE INVENTION

1. Technical Field

The present invention relates to the management of digital rights between untrusting parties and, more particularly, to techniques that utilize a trusted party to resolve disputes between the untrusting parties, at least on a temporary basis.

2. Description of the Related Art

Licensing of electronic (i.e., digital) content, particularly software programs, has traditionally relied on certain "trust" or "rights" models wherein a content provider (or licensor) has certain ownership rights to electronic content such as, for example, software, music, video, images, or other useful electronic information. The user (e.g., a licensee) is a party interested in acquiring the electronic content from the content provider on a temporary or permanent basis. As part of the exchange, the content provider will typically require that the user agree to, and abide by, the terms of a license agreement which sets forth the user's rights and restrictions for using the electronic content.

The content provider presumes the user to be honest, trustworthy, and willing to abide by the terms of the license. The user, likewise, presumes the content provider to be honest, trustworthy, and also willing to abide by the terms of the license. In reality, however, the content provider and end user do not trust each other. The content provider is concerned that the user will disregard the terms of the license and, for example, distribute copies of the electronic content illegally. For example, if the electronic content is software, music, or a movie, the user may create copies and distribute them to friends. The user is concerned that the content provider may inappropriately terminate the use of the electronic content even though the terms of the license have not been violated. There are other conditions that may cause concern to the user and content provider. For example, the content provider may require acceptance of a software license which dictates that the software is to be installed and used on a single computer, or that the software be used until a predetermined license expiration date (e.g., one year), at which time the license may be renewed.

While both parties have legitimate reasons for the lack of trust, it can be difficult to enforce and/or monitor violations of the license. It is also difficult for the software provider to determine if copies of the electronic content have been distributed to other users, in part, because such copying and distribution occurs in the privacy of the user's home. Illegal distribution of the electronic content can result in a reduction in sales and revenue for the content provider. At the same time, the user cannot be assured that the content provider has a legitimate reason for terminating its access to the content. If the user's business is dependent on the content, wrongful termination by the content provider can also result in significant revenue losses for the user.

Under normal circumstances, the user and content provider have limited recourses for addressing violations of the license agreement. The content provider can include monitoring software to detect actions that may be in violation of the license agreement. If the monitoring software detects such an action, then the content can be immediately disabled or otherwise locked to prevent further violations.

One technique that has been developed to address some of these problems includes implementation of a "trust" or "rights" management system on the computer for purposes of monitoring the manner in which the content is used. These rights management systems may take a wide variety of forms, as discussed in co-pending application Ser. No. 10/740,391 filed Dec. 18, 2003 entitled "Rights Management System" and having common ownership. For example, rights management systems can be implemented using software components included with the licensed content, or hardware directed by the software, in order to police use of the content for compliance with the license terms. Once a violation is detected (e.g., a user attempts to use the software after the license expiration date), the rights management systems act to disable or terminate use of the content (e.g., software), oftentimes shutting down or restarting the entire computer system.

While conventional rights management systems have proven effective in preventing unauthorized use of software, they can result in detrimental loss of data in many situations. For example, upon expiration of a license term, a conventional rights management system may restart or shut down a computer system causing any unsaved data to be lost. While losing data associated with a music player or computer game may be annoying, it does little overall harm to the user. In contrast, the expiry and termination of an operating system may cause serious data loss when the system is terminated. As a result, the usefulness of these conventional rights management systems may be outweighed by the damage caused during their utilization.

When a user's electronic content is disabled, there is generally not much to be done. The user has an option of accepting the content provider's actions and foregoing use of the content, or possibly obtaining competing/similar content from a different provider for an additional cost. There are situations, however, when this option is not possible. For example, the content at issue could be a sophisticated software package custom-tailored for the user and costing thousands, or even hundreds of thousands, of dollars. In such situations, the user stands to lose significant amounts of money from both the software loss and the business downtime.

Typically, the only recourse available in such situations is to use the legal system to present facts and obtain a judgment or remedy. However, this can be extremely time consuming due to the extensive docketing delays of most courts. Furthermore, the costs associated with obtaining a legal judgment can sometimes outweigh the benefits. Finally, the user stands to lose a continuing amount of money legal proceedings because the business relies heavily on the software for proper operation, and such operation must come to a halt as a result of the software being disabled.

SUMMARY OF THE INVENTION

In accordance with the present invention, a trusted party is used to address potential rights violations and provide at least a temporary remedy for using the content until a permanent resolution can be reached.

According to one embodiment of the invention, a method is provided for controlling access to a digital (i.e. electronic) content. The method allows receipt of a notice regarding suspension of a sender's rights to use the content. The notice is reviewed to retrieve information regarding the content and the sender's rights for using the content. Next, a key capable of restoring the sender's access to the content is generated. The key is transmitted to the sender in order to terminate the suspension of rights to use the content. Finally, information regarding at least the sender and the key is documented. According to such a method, a user's rights to access a digital content can be restored, while information is documented to verify an extension for the user to access the content. One specific implementation of the invention requires that the sender of the notice supply proof of ownership and/or authorization to access the content. This can be, for example, in the form of original licensing information supplied by the content provider. The key can also be generated such that it expires after a predetermined length of time. Such a feature allows the user to resolve any licensing issues with the content provider without being wrongfully denied access to the content.

According to another embodiment of the present invention, a method is provided for managing rights to a digital content. The method initially requires that a user accept the terms of a license agreement specifying rights to use the content. Once the terms have been accepted, or otherwise acknowledged, the user receives the content together with a key for providing access thereto. The user's access to the content is monitored in order to detect a violation of the license agreement. The user's access to the content is suspended if and when a violation of the license agreement is detected. At this point, the user would transmit a notice regarding the suspension of rights to access the content to a moderator. The notice is reviewed to retrieve information regarding the content and the license agreement. A replacement key capable of restoring the user's access to the content is then generated by the moderator. The replacement key is transmitted to the user in order to terminate the suspension of rights to use the content. Finally, information regarding at least the user and the replacement key is documented.

Other features of the present invention provide the capability of linking the content to a single hardware unit. This can be done, for example, by retrieving an identification number from a non-volatile storage area of the hardware unit being used to access the content. The hardware unit can be in the form of various devices including computer systems, CD players, DVD players, etc. The key would then be encrypted with the identification number to create an encrypted qualifier that establishes a unique relationship between the key and the identification number. The qualifier can then be monitored for tampering. If any tampering is detected, the user's access to the content would be suspended. Various types of monitoring software can also be installed on the hardware unit to identify violations that would require suspension of the user's access rights. Other embodiments of the present invention include computer program products and systems capable of controlling access, and managing rights, to a digital content.

There has thus been outlined, rather broadly, the more important features of the invention and several, but not all, embodiments in order that the detailed description that follows may be better understood, and in order that the present contribution to the art may be better appreciated. There are, of course, additional features of the invention that will be described hereinafter and which will form the subject matter of the appended claims.

In this respect, before explaining at least one embodiment of the invention in greater detail, it is to be understood that the invention is not limited in its application to the details of construction and to the arrangements of the components set forth in the following description or illustrated in the drawings. Rather, the invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These, and various features of novelty which characterize the invention, are pointed out with particularity in the appended claims forming a part of this disclosure. For a better understanding of the invention, its operating advantages and the specific benefits attained by its uses, reference should be had to the accompanying drawings and preferred embodiments of the invention illustrating the best mode contemplated for practicing the invention.

DETAILED DESCRIPTION OF THE INVENTION

Figure 1:
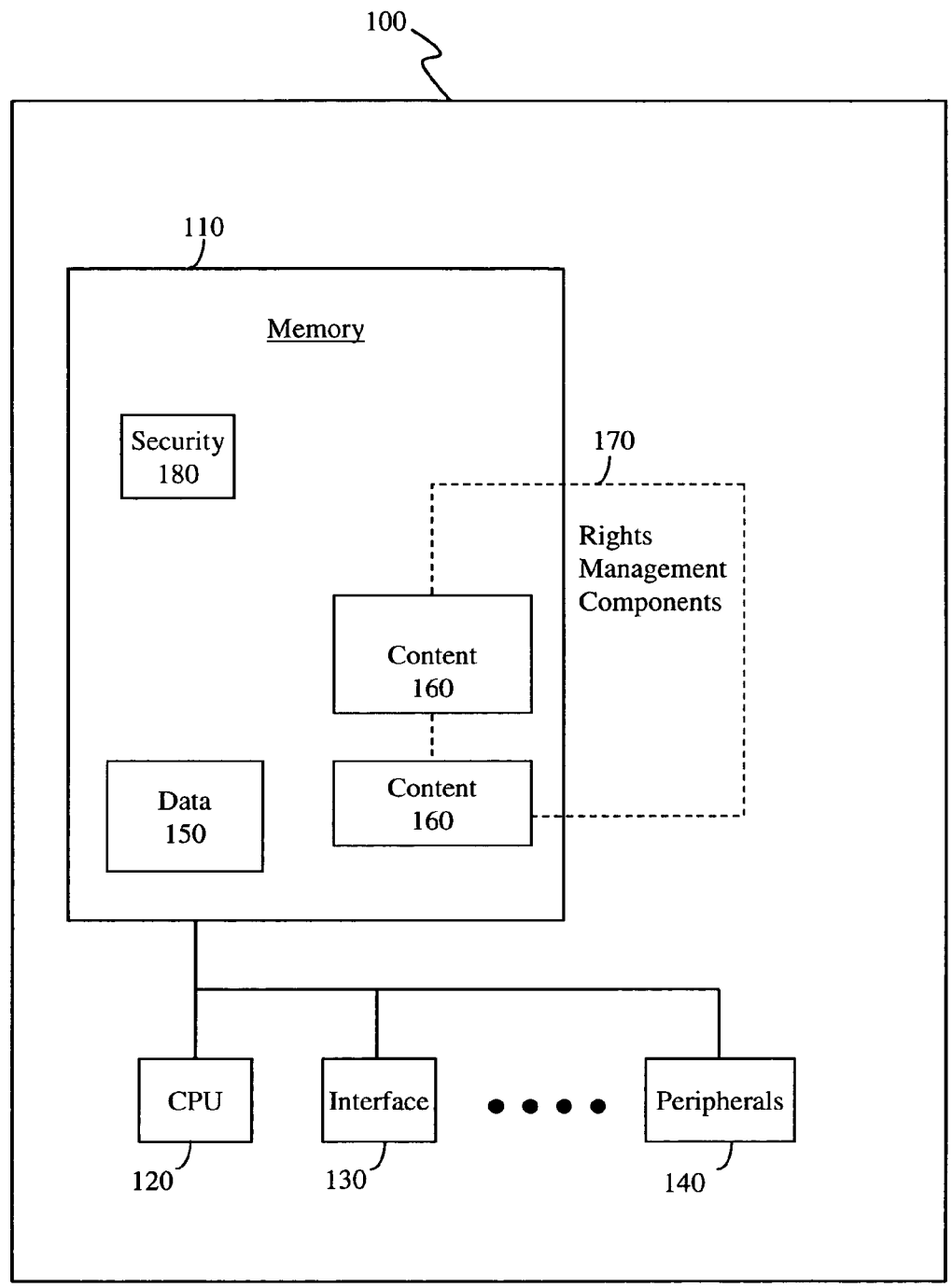
FIG. 1 is a block diagram illustrating an example of a computer system utilizable for implementing a rights management system of the present invention.

Reference now will be made in detail to preferred embodiments of the invention. Such embodiments are provided by way of explanation of the invention, which is not intended to be limited thereto. In fact, those of ordinary skill in the art will appreciate, upon reading the present specification and viewing the present drawings, that various modifications and variations can be made.

For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

The present invention provides a technique for controlling use of electronic content for use with different types of hardware. As used herein, the term content (or electronic content) refers to any type of digital data and/or information. For example, the data can be software code (i.e., software program) capable of being executed by a computer system. The data can also be music, a video, or video containing music and/or other sounds. The data can also be a full-length movie. The term hardware (or hardware unit) can correspond to any device that is usable for accessing the data. For example, if the data is in the form of music stored on a compact disc (CD), then the hardware would correspond to any standard CD player or other device capable of playing a CD. If the data is in the form of a movie, or possibly music, stored on a digital video disc (DVD), the hardware would correspond to a standard DVD player, or any device capable of playing a DVD. If the data is in the form of software or data files, then the hardware would be a computer system having the appropriate operating system for accessing the data. Such operating systems include, but are not limited to, Linux, Unix, Windows, and MacOs. Oftentimes, however, a computer system will be appropriate for most, if not all, data due to the ability to add various components and peripherals such as CD and DVD drives. Furthermore, the hardware can be in the form of portable devices such as mobile phones, PDAs, and other similar devices.

A content provider can provide monitoring software capable of detecting violations of a license agreement. The monitoring software would typically be provided together with the content. Upon detection of a possible violation, the monitoring software would typically restrict, or suspend, the user's access to the content. This action takes place because the content provider generally does not trust the user to abide by the terms of the license agreement. The user, on the other hand, does not trust the content provider to verify, or take appropriate steps to verify, that the terms of the license agreement are truly being violated. Various concerns are thus raised by both parties.

The present invention advantageously addresses the trust concerns of both the user and the content provider through the use of a trusted third party (i.e., a moderator or arbiter). Accordingly, the user can be assured that his rights to the content will not be violated or restricted. Likewise, the content provider can be assured that the user's rights are only suspended for legitimate violations of the content. The description that follows provides one example of an implementation of the techniques of the present invention using a computer system.

Referring now to the drawings and initially to FIG. 1, a block diagram is illustrated to show a computer system 100 suitable for managing and controlling access to digital content according to an exemplary embodiment of the present invention. As shown in FIG. 1, the computer system 100 includes a memory device 110, a processing unit 120, interfaces to input/output devices 130, and any other components 140 typically available to computer systems (e.g., displays, peripheral devices, CD drives, DVD drives, printers, etc.). Examples of such computer systems include any of a number of different types of personal computers, laptop computers, servers, etc. including those having Pentium based processors, and systems utilizing operating systems such as Windows (all variants), MacOS, Unix, or Linux. Other devices having somewhat similar configurations include personal digital assistants (PDA), cellular telephones, pagers, etc.

The memory device 110 includes, for example, any type of permanent or semi-permanent storage (e.g., hard disc drives, memory cards, removable media, portable drives, etc). As shown in FIG. 1, the memory device 110 may be used to store any number of data files 150 and/or electronic content 160 (e.g., systems and/or applications software, music, video, etc.). In addition, as will be discussed below, in some embodiments of the present invention a security component 180 (e.g., security software) also may be stored in memory device 110. The security component 180 can be part of the operating system or other standard part of the computer system 100.

In addition to the components described above, the computer system 100 can also include one or more rights management components 170 to monitor and control use of electronic content 160 obtained under certain licensing agreements. Rights management components 170 are 'trusted' from the perspective of, for example, a content provider or licensor, and in the sense that they prevent unauthorized use and/or copying of the electronic content 160 (e.g., use that is not in compliance with license terms). The rights management components 170 are typically provided by, or under the control of, the content provider. Rights management components 170 may include any of software, BIOS routines, hardware, etc. (or combinations thereof).

For instance, with embodiments of the present invention that utilize software forms of the rights management components 170, the rights management components 170 may be included and installed as a component of the electronic content 160, particularly when in the form of software programs. With embodiments of the present invention that utilize hardware forms of rights management components 170, the rights management components may be activated during installation and execution of the electronic content 160. Optionally, the rights management components can rely on information (possibly encrypted) that is stored on media carrying the content. The hardware would check the information on the media to determine authenticity.

During normal operation, the rights management components 170 would control and prevent unauthorized use of electronic content 160 by monitoring for activities that are not in compliance with the terms of the license agreement (i.e., license terms associated with the content 160). For instance, upon expiration of a license agreement, the rights management components 170 may save the data of a word processing program to the data area 150. Once this information has been saved, the rights management components 170 could terminate execution of, or disable, the content. Depending on the specific rights management components 170, the user may or may not receive access to unsaved data once a violation has been detected.

As will be discussed in greater detail below, the present invention advantageously allows the user to contact an arbiter capable of restoring access to the content by providing an indication, to the rights management components 170, that the user is now in compliance with the terms of the license agreement. This can be done for example by providing the user with a replacement key (or license information) capable of restoring access for a temporary or permanent basis. Alternatively, the arbiter can generate a software program capable of bypassing, or negotiating with, the rights management components 170 to restore access at least on a temporary basis.

Figure 2:
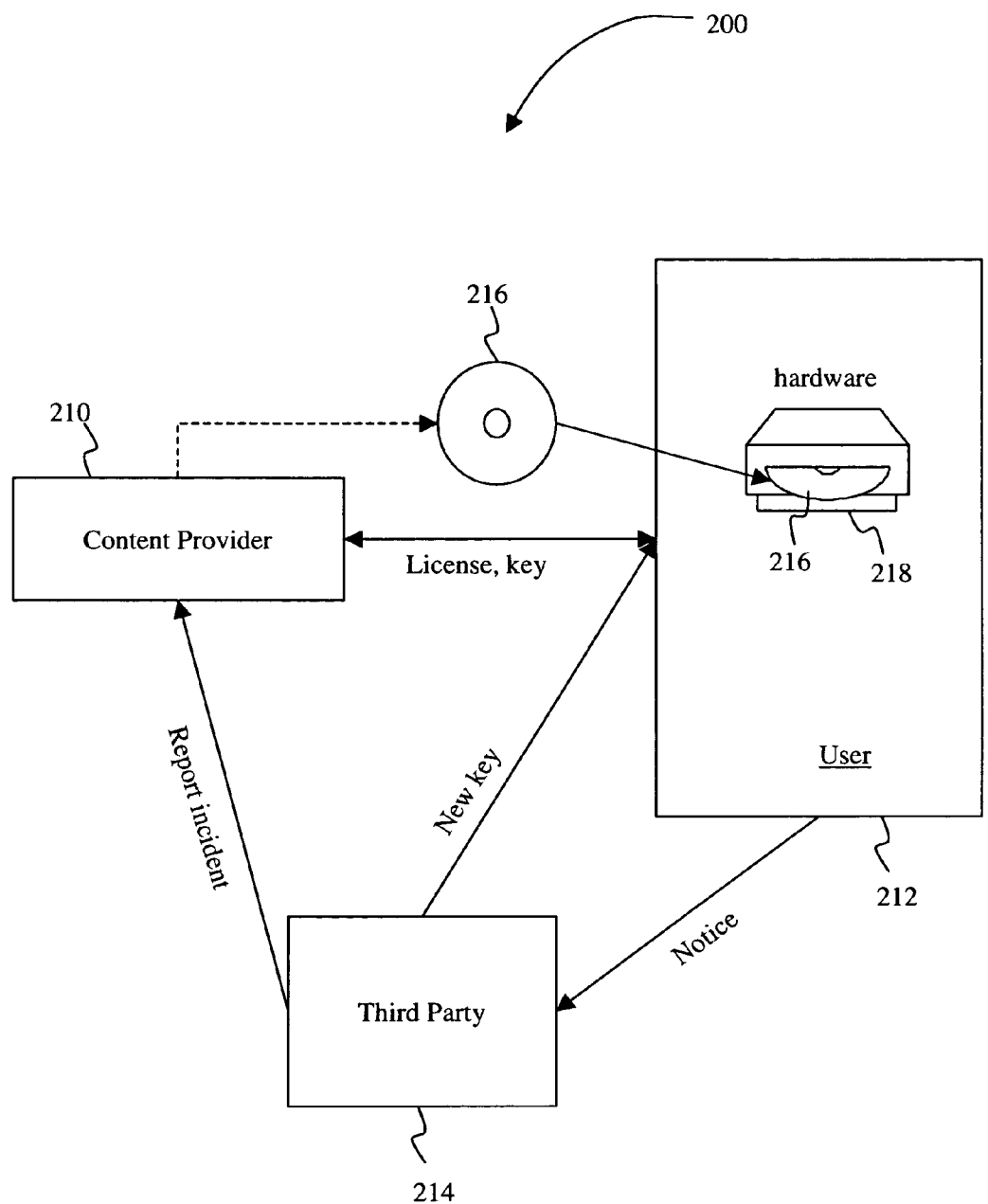
FIG. 2 is a block diagram illustrating or rights management system in accordance with an exemplary embodiment of the present invention.

Turning now to FIG. 2, a digital rights management system 200 is illustrated for practicing the invention according to an exemplary embodiment. The digital rights management system 200 of FIG. 2 includes a content provider 210, a user 212, and a third party 214. The content provider 210 is generally the owner of the content. For example, the content provider 210 can be a software vendor, a music distributor, a video distributor, etc. As previously stated, the content 216 can be in the form of computer software, music, video, movies, digital data, etc. The content provider 210 enters into a transaction wherein, for example, the user 212 will obtain certain rights to use the content 216. Typically, this transaction is in the form of a purchase or sale. Thus, it should be understood that the content provider 210 may act through various representatives, such as a retail establishment. The user 212 pays a fee to the content provider 210 in exchange for the content 216, or an authorized copy thereof. The content provider 210 will request that the user 212 agree to the terms of one or more license agreements. In exchange, the content provider 210 provides the user 212 with access to the content 216. This can be in the form of a key or other unique identifier. Alternatively, information can be stored on the medium carrying the content to provide authentication. Various other means can also be used.

Once the user 212 obtains the content 216, they are free to use it within the limits of the license agreement. In general, the license agreement is structured such that it protects the content provider 210 from violations by the user 212. For example, the content provider 210 may provide the user 212 with unrestricted access to the content 216. However, this access does not extend to the user's associates, friends, etc.

Therefore copying and redistributing the content 216 would be considered a violation of the license agreement. Similarly, the content provider 210 may provide the user 212 with unrestricted access to the content 216 from a single hardware unit 218. For example, a particular software program may be licensed to the user 212 for use on a single computer system. Accordingly, if the user 212 were to install the software on a different computer, that action would constitute a violation of the license agreement. As another example, a content provider 210 may allow a user 212 to download a movie or video for access on a single computer. The access rights given to the user 212 would not extend to copying of the video to a portable medium, such as a DVD disc, and watching the movie on a different computer, or redistributing the copied discs to friends.

In order to protect itself from violations of the license agreement, the content provider 210 can install special rights management components 170 (e.g., in the form of monitoring software) on the hardware unit 218 in order to detect violations of the license agreement. Optionally, such monitoring software can be pre-installed on specialized components incorporated in the hardware unit 218. For example, the rights management components 170 can be pre-installed in the BIOS of hardware units such as a computer or DVD player, and accessed once the hardware unit 218 is activated.

The content 216 will often be stored on a portable media such as, for example, a CD-ROM, DVD, Floppy drive, Secure Digital Memory, Multi Media Card, etc. The user 212 would place or install the portable media in the appropriate hardware unit 218 for accessing the content 216. For example, if the medium is a CD-ROM or DVD disc, the user 212 would place the disk in an appropriate CD player or DVD player in order to access the content. In the case of music, the CD player would access the content and output the music. In the case of a Movie, the DVD player will access the content and output the appropriate video and sound combinations. Alternatively, the user 212 may access the content 216 using a computer system having appropriate peripherals connected thereto such as, for example, a DVD drive capable of playing either CD's or DVD's. In such cases, the output would be to the computer monitor (or appropriate display), and/or speakers. In the case of software programs, the user 212 would perform an installation process to the computer system. Once the content is installed, further access will be governed by compliance with the terms of the license agreement.

At this time, the rights management components 170 monitor the user's transactions with respect to the content. For example, a software program installed on the user's computer could install a rights management component to continuously monitor use of the software on the user's machine and identify instances of violations of the license agreement. The rights management components 170 can also be configured to detect copying of the content to another portable media such as, for example, a CD-ROM or a DVD disc. Certain hardware units 218 can also include the ability to detect whether portable media are originals or copies of an original. In such instances, the hardware unit 218 can suspend access to the content 216 upon detecting that the medium is not an original.

Oftentimes, errors and malfunctions can result in false detection of a violation of the license agreement. For example, a malfunction in the hardware unit's BIOS can lead the hardware unit 218 to conclude that an illegal copy of a DVD disc has been made, thus suspending the user's access to the disc. Under normal circumstances, the user 212 will have no recourse but to contact the content provider 210 and provide sufficient proof that the user 212 is rightfully entitled to access the content 216. This process can take a long time to resolve. During this time period, the user 212 is wrongly denied access to a content for which he has paid and observed the terms of the license agreement.

According to an embodiment of the present invention, the user 212 can submit a suspension notice to a third party 214 regarding suspension of rights to access the content 216. The third party 214 is selected to be an arbiter (or moderator) who is trusted by both the content provider 210 and the user 212. For example, the third party 214 can be a bank, legal entity, organization, etc., trusted to resolve issues between the content provider 210 and users 212 of the content. The third party can also be an organization established solely for purposes of resolving such disputes. Furthermore, the function of the arbiter can be implemented through appropriate software using secure and/or encrypted methodologies. Having such a third party eliminates, or at least substantially reduces, the possibility of the content provider's, or the user's, rights being violated.

The third party arbiter 214 would review the notice submitted by the user 212 in order to determine the rights that the user 212 has to use the content 216 under the terms of the licensing agreement. Under certain circumstances, it may be appropriate for the third party 214 to contact the user 212 and request additional information before any decisions can be reached. For example, if the user 212 has submitted multiple suspension notices, the third party may require proof of ownership (or similar documentation) to verify the legitimacy of the user's claim. The third party 214 can generally accept the first suspension notice to be legitimate while documenting information necessary to prove the user 212 had access to the content, and that the user 212 received extended access to the content. The information can subsequently be used by the content provider 210 to prove that the user 212 actually used the content (and enhance damages) in the case where unauthorized use can be proven.

The third party 214 can optionally request that the user 212 accept the terms of a new agreement indicating that the user 212 believes his rights to have been violated, and that the user 212 has a legitimate right to access the content 216. Alternatively, the third party 214 can request that the user 212 re-accept the terms of the original license agreement. Once the user 212 accepts the terms, the third party 214 will submit a new key, or similar information, to re-enable the user's access to the content 216. As yet another alternative, the third party 214 can request that the user 212 submit the original electronic license agreement for various types of verification. For example, certain content providers 210 can designate a specific third party 214 to resolve disputes with users 212. The content provider 210 could, for example, request that the third party 214 digitally sign each license that accompanies the content 216. In such situations, upon receiving the license agreement from the user 212, the third party 214 could verify that the license agreement contains third party's 214 digital signature.

During this time, the third party 214 documents information regarding the suspension notice and the provision of a new key to the user 212. The new key can be designed such that it provides the user 212 with either temporary or permanent access to the content 216. In the case of temporary access, if the dispute between the user 212 and the content provider 210 cannot be resolved within the term of the new key received from the third party 214, the user 212 would have an option to submit a new complaint to the third party 214 and obtain another temporary key while the dispute is being resolved. Again, the third party 214 would document all transactions with the user 212 and all keys generated.

The third party 214 reports all documented incidents to the content provider 210. The content provider 210 examines all information received from the third party 214, including details of the suspension notice and the key provided to the user 212. Based on this information, the content provider 210 can decide whether or not the user has been wrongly accused of violating the terms of the license agreement and, for example, either cancel any temporary keys or restore the user's access rights. Under certain circumstances, the dispute may need to be resolved through mediation and/or litigation. In such situations, the content provider 210 would be assured that a trusted third party 214 has documented proof of the user 212 being extended the right to access the content. If the mediation resolves in the content provider's favor, then the proof submitted by the third party 214 can be used to enhance the damages and/or prove intent (or willfulness) on part of the user 212. Alternatively, if the dispute is resolved in favor of the user, then the user 212 would not have suffered any extended periods of time where they could not access the content 216.

Figure 3:
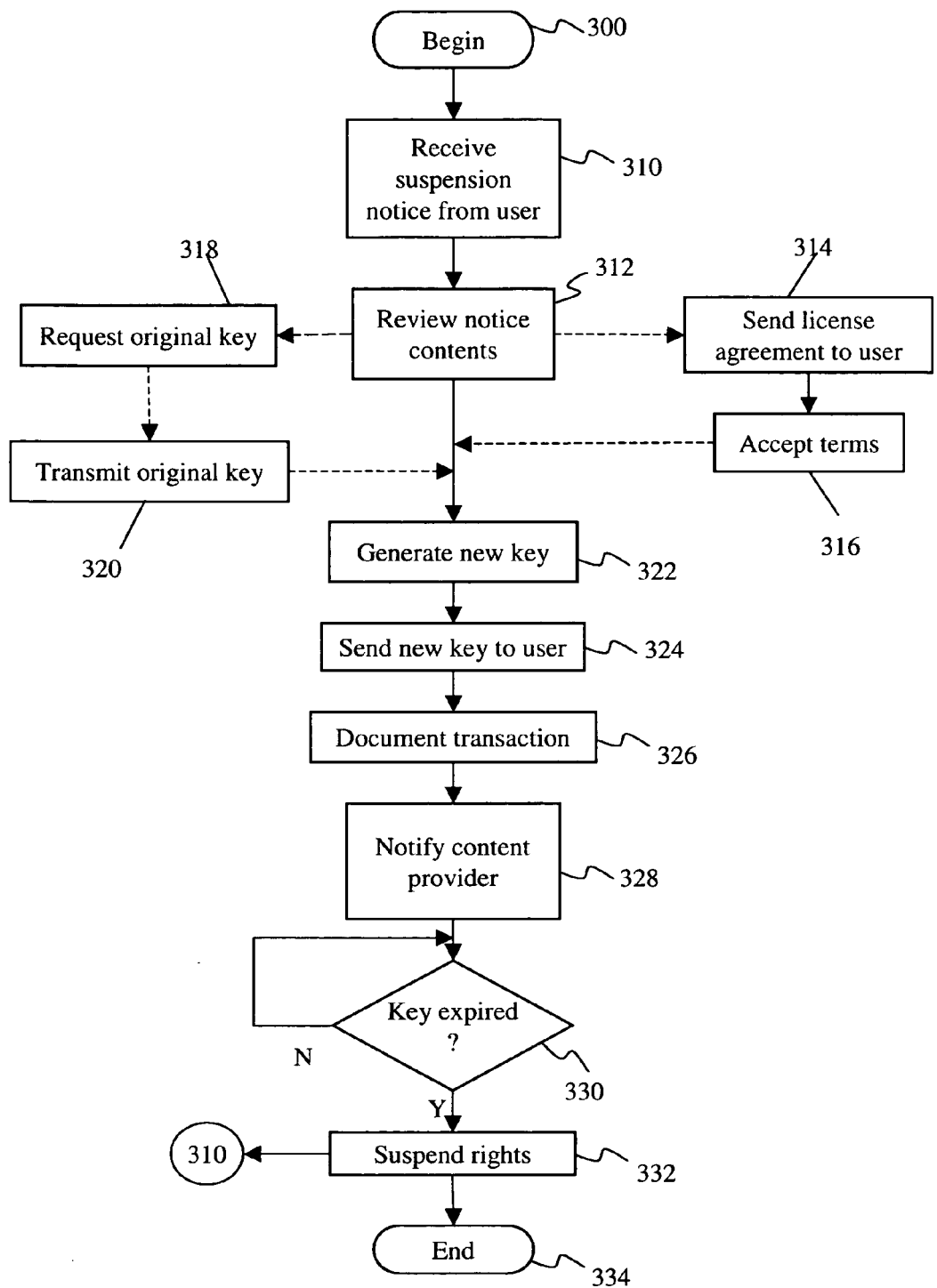
FIG. 3 is a flow chart illustrating the steps performed to control access to a digital content in accordance with an embodiment of the present invention.

FIG. 3 illustrates the steps performed in controlling access to content in accordance with one embodiment of the present invention. The process begins at step 300. This would typically correspond to a point where the rights management component 170 has detected a violation of the license agreement, and disabled the user's access to the content 216. At step 310, the third party 214 receives a suspension notice from the user 212. The suspension notice would include various details regarding the content 216, the license agreement, etc. Optionally, the suspension notice can include proof of purchase from the user 212 showing ownership of the content 216. The user 212 can further describe the reasons why it is believe that the license agreement has not been violated.

At step 312, the third party 214 reviews the contents of the suspension notice in order to collect the facts surrounding the suspension. At step 314, the third party 214 can optionally send a new license agreement, such as a license extension, to the user 212. At step 316, the user 212 accepts the terms of the license and provides an appropriate indication to the third party. The indication can be in the form of an acknowledgment (or selection of appropriate buttons in the case of a click-wrap license), a signed agreement, and/or a digitally signed response. As previously discussed, the third party 214 can also request that the user 212 re-sign or re-accept the terms of the original license agreement. In some instances, the third party 214 may only review the notice, and request that the user 212 verify or acknowledge its contents. Furthermore, the third party 214 can request that the user 212 provide the original key that was included with contents such as software programs. This is illustrated at step 318. At step 320, the user 212 transmits the original key to the third party 214.

Once the third party 214 has collected all the information from the user 212, a new key is generated at step 322. The new key is sent to the user 212 at step 324. As previously discussed, the new key submitted to the user 212 can provide either temporary or permanent access to the content 216. Thus, in the event that the content provider 210 must negotiate a resolution with the user 212, the temporary key could assure that the user 212 is not given permanent access to the content 216 if the license agreement was truly violated. There are other cases, for example, where the third party 214 would be obligated to provide the user 212 with a permanent key. For example, if the content provider 210 is no longer in business and/or otherwise inaccessible, the user 212 would still be entitled to access the content 216. Therefore, rather than providing temporary keys on a continuing basis, the third party 214 would provide a permanent key to the user 212 to prevent further discontinuities in the user's access to the content 216.

At step 326, the third party 214 documents all relevant information related to the transaction. The information can include, for example, the user's name and other pertinent information, proof of ownership of the content, and/or the user's reasons for believing that the license agreement has not been violated. At step 328, the third party 214 notifies the content provider 210 of the transaction. More particularly, the third party 214 would submit all (or an appropriate portion of) the documented information to the content provider 210, as well as information relating to the new key that has been provided to the user 212.

Once the user 212 enters the new key to regain access to the content 216, the rights management component 170 would again be activated with respect to the content. This is illustrated by step 330, where the rights management component 170 continually monitors the hardware unit to determine if the key has expired or, under appropriate circumstances, whether the user 212 has again violated the terms of the license agreement. If no violation is detected, then the user 212 is allowed to continue accessing the content 216. This process continues until the new key either expires or a violation is detected. Once the key has expired, the user's rights would be suspended as indicated at step 332. Again, if this is believed to be an error, then the process would begin again at step 320 where the third party 214 would receive a new suspension notice from the user 212. Otherwise, if the user 212 does not wish to challenge the suspension of rights, then the process ends at step 334.

Figure 4:
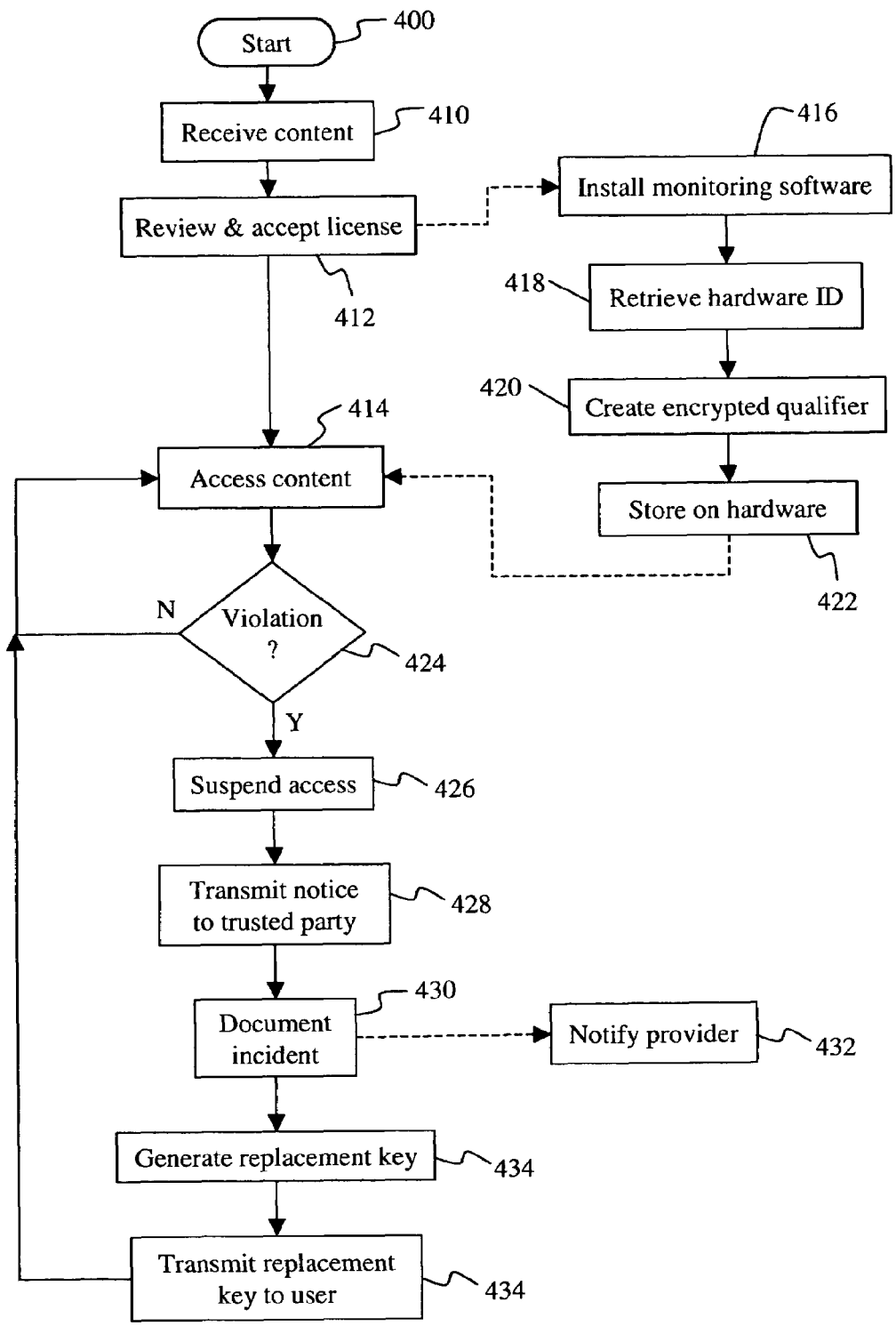
FIG. 4 is a flow chart illustrating the steps performed while managing the rights to a digital content in accordance with an embodiment of the present invention.

FIG. 4 illustrates the steps performed in managing the rights to a digital (i.e. electronic) content according to an embodiment of the present invention. The process begins at step 400. This corresponds to the point where the user 212 is involved in a transaction to obtain the content 216 from the content provider 210, or appropriate retailer, distributor, etc. The user 212 receives the content 216 at step 410. At step 412, the user 212 must review and accept the terms of a license agreement provided by the content provider 210. If the content 216 is in the form of a software program stored on an appropriate medium, then the user 212 would typically be prompted to click a selection box signifying acceptance of the terms of the license agreement (i.e., a click-wrap license). Additionally, if the content is stored on a portable media, a shrink-wrap license may be included which indicates that the user 212 is willing to accept the terms of the license by breaking the wrapper and using the media stored therein. As previously discussed, the different hardware units 218 can include built-in rights management components 170, or the rights management components 170 can be transferred to the hardware unit 218 as part of the installation process of, for example, a software program. This is illustrated at step 416 wherein a rights management component 170 in the form of monitoring software is installed on the user's computer.

At step 418, the rights management component 170, or monitoring software, retrieves a unique hardware ID from the user's computer (i.e. the hardware unit). The hardware ID can be a unique number assigned for example, to the central processing unit (CPU), the peripheral device or drive used to install the content 216, etc. The rights management component 170 creates an encrypted qualifier at step 420. The encrypted qualifier would be result of encrypting the hardware ID retrieved from the hardware unit 218 with a public key of the content provider 210 which could be included as part of the rights management component 170. Alternatively, the rights management component (i.e., monitoring software)

can generate the encrypted qualifier without having to retrieve any identification from the hardware unit 218. The encrypted qualifier would then be stored on the hardware unit 218 at step 422. Various steps can also be taken to detect tampering and/or create a relationship between the encrypted qualifier and the hardware unit 218 with necessarily relying on a hardware ID.

In the case of the computer system, the encrypted qualifier would typically be stored on the computer's hard drive or similar storage device. In the case of other portable hardware units 218, the encrypted qualifier could be stored, for example, on a removable memory card such as secured digital, multi-media, compact-flash, etc. Once the encrypted qualifier is created and stored on the hardware unit 218, a unique link is established between the content 216 and the hardware unit 218. Thus, as part of monitoring for violations of the license agreement, the rights management component 170 can check to see if the encrypted qualifier exists on the hardware unit 218. If the encrypted qualifier does not exist, this would signify that the content is being used on a different machine than originally intended. The rights management component 170 can periodically verify that the encrypted qualifier indeed matches up with the content provider's public key as part of a routine test for tampering. Once the encrypted qualifier is stored on the hardware unit 218, the user 212 is allowed to access the content at step 414. Alternatively, once the user accepts the terms of the license, access can be provided to the content.

Regardless of the type of rights management component 170 used, there is constant monitoring to determine if a violation of the license agreement has occurred. This is illustrated by step 424 wherein the rights management component 170 checks for a violation of the license agreement. If no violation has occurred, then the user 212 is provided continued access to the content 216. However, if a violation is detected, then the user's access is suspended at step 426. The user 212 then has an option to transmit a suspension notice to a trusted party, i.e., the third party 214. In general, the user would only transmit such a suspension notice if it is believed that the license agreement has not been violated. Users who illegally obtain the content 216 would not send a suspension notice (or would not send a valid suspension notice) to the trusted party. If such were the case, then such a user's rights to access the content would be permanently, and rightfully, suspended.

At step 430, the third party 214 (i.e., trusted party) documents the incident. As previously discussed, this step involves storing at least all the information submitted by the user 212 for later use. The third party 214 can store additional information, as deemed necessary. Optionally, at step 432, the trusted party 214 can notify the content provider 210 that a suspension notice has been received. The third party 214 would further submit all, or appropriate, information regarding the suspension notice to the content provider 210. At step 434, a replacement (or new) key is generated for the user 212. As previously indicated the replacement key can provide the user 212 either temporary or permanent access to the content 216. At step 436, the replacement key is transmitted to the user 216. At this point, control returns to step 414 where the user 212 is again allowed access to the content 216. This process can continue until the content provider 210 and user 212 reach a resolution to the dispute regarding the license agreement. Alternatively, the user 212 can be provided with a key which allows permanent access to the content, and further actions would be unnecessary.

The many features and advantages of the invention are apparent from the detailed specification, and thus, the appended claims are intended to cover all such features and advantages which fall within the true spirit and scope of the invention. Further, since numerous modifications and variations will become readily apparent to those skilled in the art, the invention should not be limited to the exact construction and operation illustrated and described. Rather, all suitable modifications and equivalents may be considered as falling within the scope of the claimed invention.

What is claimed is:

1. A method of controlling access to digital content, comprising the steps:
   receiving a notice regarding suspension of a sender's rights to use the content, the content provided by a content provider;
   reviewing the notice by a third party to retrieve information regarding the content and the sender's right for using the content;
   transmitting a key to the sender in order to terminate the suspension of rights to use the content;
   documenting information by the third party regarding at least the sender and the key, including information indicative of the sender's reason for believing that a violation has not occurred; and
   reporting by the third party to the content provider at least a portion of the information that was documented, including the information indicative of the sender's reason.

2. The method of claim 1, wherein the step of reporting comprises transmitting a message containing information regarding the notice.

3. The method of claim 1, further comprising a step of generating a key capable of restoring the sender's access to the content.

4. The method of claim 1, further comprising a step of obtaining, from the sender, acknowledgement of acceptance of a license agreement detailing terms for using the content, prior to transmitting the key.

5. The method of claim 4, further comprising a step of requesting the sender provide an original key previously received from a provider of the content.

6. The method of claim 4, wherein the third party is an arbiter and the key is generated by the arbiter and further comprising a step of verifying if the license agreement has been digitally signed by the same arbitrator.

7. The method of claim 1, wherein the key has a predetermined lifespan, and further comprising a step of re-suspending the sender's rights to use the content upon expiration of the key's lifespan.

8. The method of claim 7, further comprising a step of establishing a mediation between the sender and the content provider to determine at least one reason why the sender's right have been suspended.

9. The method of claim 1, wherein the content includes a software program.

10. The method of claim 1, wherein the content includes music.

11. The method of claim 1, wherein the content includes video.

12. The method of claim 1, wherein the content is stored on a computer-readable medium.

13. A method of managing rights to a digital content, comprising the steps:
   requesting that a user accept terms of a license agreement specifying rights to use the content;
   receiving the content together with a key for providing the user access to the content, the content being provided by a content provider;
   monitoring use of the content to detect a violation of the license agreement;
   suspending the user's access to the content upon detecting a violation;
   transmitting a notice, from the user to a third party, regarding suspension of rights to use the content;

reviewing the notice to retrieve information regarding at least the content and the license agreement;

transmitting a replacement key to the user in order to permit the user to restore access to the content;

documenting, by the third party, information regarding at least the user and the replacement key, including information indicative of the user's reason for believing that the license agreement has not been violated; and reporting by the third party of the content provider at least a portion of the information that was documented, including the information indicative of the user's reason.

14. The method of claim 13, wherein the step of reporting comprises transmitting a message containing information regarding the notice.

15. The method of claim 13, wherein the step of receiving the content comprises the steps:

receiving the content together with a key for providing the user access to the content; and linking the content to a single hardware unit.

16. The method of claim 15, wherein the step of linking comprises the steps:

retrieving at least one identification number from a non-volatile storage area of the hardware unit; and encrypting the key and the at least one identification number to create an encrypted qualifier establishing a relationship between the key and the hardware unit.

17. The method of claim 16, further comprising a step of saving the encrypted qualifier in a non-volatile storage location of the hardware unit.

18. The method of claim 17, further comprising the steps: monitoring the encrypted qualifier for at least one instance of tampering; and suspending the user's access to the content upon detecting an instance of tampering with the encrypted qualifier.

19. The method of claim 15, wherein the step of linking comprises the steps:

installing monitoring software on the hardware unit;

encrypting the key and data from at least one of: the monitoring software and one or more identification numbers associated with the hardware unit in order to create an encrypted qualifier establishing a relationship between the key and the hardware unit; and storing the encrypted qualifier in a non-volatile storage location of the hardware unit.

20. The method of claim 19, wherein the monitoring software detects at least one instance of tampering with the encrypted qualifier, and further comprising a step of suspending the user's access to the content.

21. A method of providing access to a digital content, comprising the steps:

accepting terms of a license agreement specifying rights to use the content, content being provided by a content provider;

receiving the content together with a key for providing access to the content;

monitoring use of the content to detect a violation of the license agreement;

suspending access to the content upon detecting a violation;

transmitting a notice to a third party regarding suspension of rights to use the content;

receiving a replacement key to restore access to the content; and reporting by the third party to the content provider information regarding the notice and the replacement key, including information indicative of a user's reason for believing that the license agreement has not been violated.

22. A computer program product, residing on a computer-readable medium, for use in controlling access rights to a digital content, said computer program product comprising instructions for causing a computer system to:

receive a notice regarding suspension of a sender's rights to use the content, the content provided by a content provider;

review the notice to the third party to retrieve information regarding the content and the sender's rights for using the content;

transmit the key to the sender in order to terminate the suspension of rights to use the content;

document information by the third party regarding at least the sender and the key, including a reason the sender believes that a violation has not occurred; and report information from the third party to the content provider regarding the sender and the key, including the reason, that was documented.

23. The computer program product of claim 22, wherein the information reported to the content provider comprises a message regarding the notice.

24. The computer program product of claim 22, further comprising instructions for causing the computer system to generate a key capable of restoring the sender's access to the content.

25. The computer program product of claim 22, further comprising instructions for causing the computer system to obtain, from the sender, acknowledgement of acceptance of a license agreement detailing terms for using the content, prior to transmitting said key.

26. The computer program product of claim 25, further comprising instructions for causing the computer system to request the sender provide an original key previously received from a provider of the content.

27. The computer program product of claim 25, wherein the third party is an arbiter and said key is generated by the arbiter and further comprising a step of verifying if the license agreement has been digitally signed by the same arbitrator.

28. The computer program product of claim 22, wherein said key has a predetermined lifespan, and further comprising instructions for causing the computer system to re-suspend the sender's rights to use the content upon expiration of said key's lifespan.

29. The computer program product of claim 28, further comprising instructions for causing the computer system to establish a mediation between the sender and the content provider to determine at least one reason why the sender's rights have been suspended.

30. The computer program product of claim 22, wherein the content comprises a software program.

31. The computer program product of claim 22, wherein the content comprises music.

32. The computer program product of claim 22, wherein the content comprises video.

33. The computer program product of claim 22, wherein the content is stored on a computer-readable medium.

34. A computer program product, residing on a computer-readable medium, for use in managing rights to a digital content, said computer program product comprising instructions for causing a computer system to:

request that a user accept the terms of a license agreement specifying rights to use the content, the content provided by a content provider;

receive the content together with a key for providing the user access to the content;

monitor use of the content to detect a violation of the license agreement;

suspend the user's access to the content upon detecting a violation; and transmit a notice, from the user to the third party, regarding suspension of rights to use the content;

document information regarding at least the user and the replacement key, by the third party, including a reason the user believes that the license agreement has hot been violated; and report information from the third party to the content provider regarding the user and the replacement key, including the reason, that was documented.

35. The computer program product of claim 34, wherein the information reported to the content provider comprises a message regarding the notice.

36. The computer program product of claim 34, wherein content is received together with a key for providing the user access to the content, and further comprising instructions for causing the computer system to link the content to a single hardware unit.

37. The computer program product of claim 36, further comprising instructions for causing the computer system to link the content by performing the steps:
retrieving at least one identification number from a non-volatile storage area of the hardware unit; and
encrypting the key and the at least one identification number to create an encrypted qualifier establishing a relationship between the key and the hardware unit.

38. The computer program product of claim 37, further comprising instructions for causing the computer system to save the encrypted qualifier in a non-volatile storage location of the hardware unit.

39. The computer program product of claim 38, further comprising instructions for causing the computer system to:
monitor the encrypted qualifier for at least one instance of tampering; and
suspend the user's access to the content upon detecting an instance of tampering with the encrypted qualifier.

40. The computer program product of claim 36, further comprising instructions for causing the computer system to:
install monitoring software on the hardware unit;
encrypt the key and data from at least one of: the monitoring software and one or more identification numbers associated with the hardware unit in order to create an encrypted qualifier establishing a relationship between the key and the hardware unit; and
store the encrypted qualifier in a non-volatile storage location of the hardware unit.

41. The computer program product of claim 40, wherein the monitoring software detects at least one instance of tampering with the encrypted qualifier, and further comprising instructions for causing the computer system to suspend the user's access to the content.

42. A system for controlling access fights to a digital content, comprising:
means for receiving a notice regarding suspension of a sender's fights to use the content, the content provided by a content provider;
means for reviewing the notice by a third party to retrieve information regarding the content and the sender's rights for using the content;
means for generating a key capable of restoring the sender's access to the content;
means for transmitting the key to the sender in order to terminate the suspension of rights to use the content;
means for documenting information regarding at least the sender and the key, including information indicative of a reason the sender believes that a violation has not occurred; and means for reporting documented information from the third party to the content provider regarding the sender and the key, including the reason.

43. The system of claim 42, wherein the means for reporting from the third party to the content provider transmits information regarding the notice.

44. The system of claim 42, further comprising means for generating a key capable of restoring the sender's access to the content.

45. The system of claim 42, further comprising means for obtaining, from the sender, acknowledgement of acceptance of a license agreement detailing terms for using the content, prior to transmitting the key.

46. The system of claim 45, further comprising means for requesting the sender provide an original key previously received from a provider of the content.

47. The system of claim 45, wherein the third party is an arbiter and the key is generated by the arbiter and further comprising means for verifying if the license agreement has been digitally signed by the same arbitrator.

48. The system of claim 42, wherein the key has a predetermined lifespan, and further comprising means for re-suspending the sender's rights to use the content upon expiration of the key's lifespan.

49. The system of claim 48, further comprising means for establishing a mediation between the sender and the content provider to determine at least one reason why the sender's rights have been suspended.

50. The system of claim 42, wherein the content includes a software program.

51. The system of claim 42, wherein the content includes music.

52. The system of claim 42, wherein the content includes video.

53. The system of claim 42, wherein the content is stored on a computer-readable medium.

54. A system for controlling access rights to a digital content, comprising:
means for requesting that a user accept terms of a license agreement specifying rights to use the content, the content provided by a content provider;
means for receiving the content together with a key for providing the user access to the content;
means for monitoring use of the content to detect a violation of the license agreement;
means for suspending the user's access to the content upon detecting a violation;
means for transmitting a notice, from the user to a third party, regarding suspension of rights to use the content;
means for reviewing the notice to retrieve information regarding at least the content and the license agreement;
means for generating a replacement key capable of restoring the user's access to the content;
means for transmitting the replacement key to the user in order to terminate suspension of rights to use the content;
means for documenting, by the third party, information regarding at least the user and the replacement key, including information indicative of a reason the user believes that a violation of the license agreement has not occurred; and
means for reporting documented information from the third party to the content provider regarding the user and the replacement key, including the reason.

* * * * *

UNITED STATES PATENT AND TRADEMARK OFFICE
CERTIFICATE OF CORRECTION

| | |
|---|---|
| PATENT NO. | : 7,681,241 B2 |
| APPLICATION NO. | : 10/870547 |
| DATED | : March 16, 2010 |
| INVENTOR(S) | : Alan Cox |

Page 1 of 1

It is certified that error appears in the above-identified patent and that said Letters Patent is hereby corrected as shown below:

Column 15, line 48, please delete the word "fights" and replace it with the word --rights--;

Column 15, line 50, please delete the word "fights" and replace it with the word --rights--.

Signed and Sealed this

Eighteenth Day of May, 2010

David J. Kappos
*Director of the United States Patent and Trademark Office*